US006953913B1

(12) United States Patent
Hara et al.

(10) Patent No.: US 6,953,913 B1
(45) Date of Patent: Oct. 11, 2005

(54) HOT PAN

(75) Inventors: James Richard Hara, North Oaks, MN (US); Larry Edmond Drake, Lake Elmo, MN (US); Alfred Walter Huf, III, Big Lake, MN (US)

(73) Assignee: Premier Restaurant Equipment Co., Minneapolis, MN (US)

( * ) Notice: Subject to any disclaimer, the term of this patent is extended or adjusted under 35 U.S.C. 154(b) by 0 days.

(21) Appl. No.: 10/898,766

(22) Filed: Jul. 26, 2004

(51) Int. Cl.[7] .................. A47J 27/18; A47J 36/16; A47J 36/24; A47J 27/00
(52) U.S. Cl. .................. 219/432; 219/435; 219/442; 99/330; 99/337
(58) Field of Search .................. 219/432, 435, 219/441, 442; 99/326, 330, 337, 338

(56) References Cited

U.S. PATENT DOCUMENTS

| | | | |
|---|---|---|---|
| 3,788,302 A * | 1/1974 | Malaney et al. ......... 126/374.1 |
| 4,624,178 A * | 11/1986 | Keating ..................... 99/337 |
| 5,103,801 A * | 4/1992 | Herring et al. .......... 126/374.1 |
| 5,313,876 A * | 5/1994 | Hilger et al. ................. 99/330 |
| 5,331,575 A * | 7/1994 | Koether et al. ............. 700/300 |
| 5,351,605 A * | 10/1994 | Sai et al. ..................... 99/330 |
| 5,539,185 A * | 7/1996 | Polster ....................... 219/439 |
| 5,542,344 A * | 8/1996 | Koether et al. ............... 99/330 |
| 5,586,487 A * | 12/1996 | Marino ......................... 99/330 |
| 5,655,434 A * | 8/1997 | Liebermann ................. 99/330 |
| 6,009,794 A * | 1/2000 | Casey et al. ................. 99/330 |
| 6,730,889 B1 * | 5/2004 | Jones-Lawlor ............. 219/506 |
| 2003/0167930 A1 * | 9/2003 | Narcissi et al. ............... 99/339 |

* cited by examiner

Primary Examiner—Joseph Pelham
(74) Attorney, Agent, or Firm—Leffert Jay & Polglaze, P.A.

(57) ABSTRACT

A pan warmer and controller for the pan warmer allows a user to preset operating conditions of the pan warmer using a digital controller, and to lock out changes to the operation of the pan warmer unless a code has been entered. The pan warmer monitors water level and temperature, and automatically adjusts water levels and water temperature.

22 Claims, 2 Drawing Sheets

HOT PAN

FIELD

The present invention relates generally to food warmers, and in particular the present invention relates to self-contained food warmers.

BACKGROUND

Hot pan warmers are used in the food service industry to maintain food temperatures, for example for serving food on a buffet or the like, or to heat food for a buffet. Food pan warmers have typically been used that include dial controls that are analog in nature. Such controls do not allow for precise control of the temperature to which a pan warmer is set, and can easily be bumped or changed without any knowledge of a supervisor or the like. When a pan warmer control of this type is adjusted, the result can be food that is not heated to the proper temperature to prevent spoilage, or if the temperature is too hot, to further or overcooking, as well as potentially serious burns if there is a spill or the like.

The sensors used in typical pan warmers are also not very precise. Typical sensors for water level include float type sensors which are susceptible to unreliability because they can get clogged with deposits from water or the like, and can get bent so as to not accurately maintain a water level, causing intermittent drainage or filling of the water pan, further eroding the accuracy of temperature control methods.

For the reasons stated above, and for other reasons stated below which will become apparent to those skilled in the art upon reading and understanding the present specification, there is a need in the art for an improved pan warmer with closer tolerances, an ability to auto detect and fill without problems, and to allow lockout of controls from change.

SUMMARY

The above-mentioned problems and other problems are addressed by the present invention and will be understood by reading and studying the following specification.

In one embodiment, a pan warmer includes a pan body having an opening for a drop in pan, a drop in pan having a drain and a fill valve, a sensor for determining temperature of water in the pan, and heating elements for heating water in the pan. The sensor and heating elements are monitored and operated by a controller connected to the sensor to receive signals from the sensor and to the heating elements.

In another embodiment, a pan warmer includes a pan body having an opening for a drop in pan, a drop in pan having a drain and a fill valve, the fill valve connectable to a water supply, a number of heating elements disposed within the pan, a temperature sensor disposed to measure temperature of water in the pan, a number of level sensors to measure the level of water in the pan, and a controller connected to receive signals from the sensors, and connected to operate the heating elements and the fill valve in response to received temperature and level sensor measurements.

In still another embodiment, a method of operating a pan warmer includes setting a controller with a desired pan water temperature, and locking out further adjustments of the temperature without a predetermined authorization.

In yet another embodiment, a method of operating a pan warmer includes monitoring temperature in a pan of the pan warmer, heating water in the pan with a heating element when the temperature is lower than a predetermined desired water temperature, monitoring water level in the pan, adding water to the pan when the water level falls below a predetermined water level, and controlling the operation of the pan warmer using a controller connected to monitor the temperature and level, the controller programmable to set operating conditions once and then lock out changes in operation.

Other embodiments are described and claimed.

DETAILED DESCRIPTION

Figure 1:
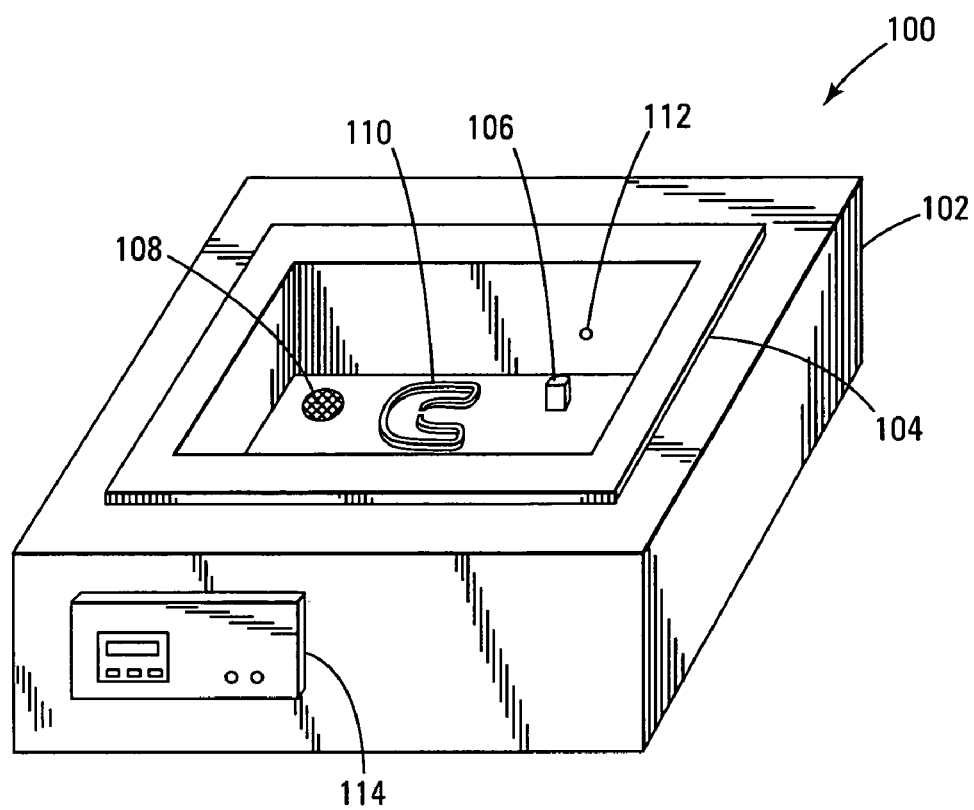
FIG. 1 is a perspective view of a pan warmer according to one embodiment of the present invention.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The following detailed description is, therefore, not to be taken in a limiting sense, and the scope of the present invention is defined only by the appended claims, along with the full scope of equivalents to which such claims are entitled.

Referring to FIG. 1, an embodiment 100 of a pan warmer is shown. Pan warmer 100 comprises in this embodiment a pan body 102 that holds a pan or water receptacle 104. Pan 104 holds water that can be fed into the pan 104 through filler 106 and drained through drain 108. Heating element 110 heats water in the pan 104. Water temperature is determined by temperature sensor 112. A controller 114 is connected to the temperature sensor 112 to receive water temperature information therefrom, and to heating element 110 to control heating operation thereof.

Level sensors to determine water level may also be used in one embodiment. Such sensors are described in further detail below. When level sensors are used, the filler 106 may be connected to be controlled by controller 114 to add water to the pan 104 when a sensor determines that water level has fallen to or below a certain predetermined level, and to stop filling of the pan 104 when the water level has reached a predetermined desirable level, or the like.

Figure 2:
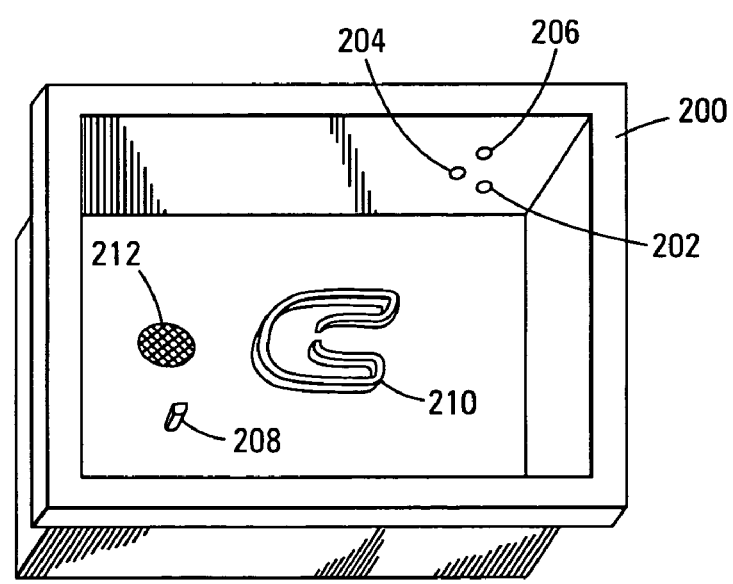
FIG. 2 is a diagram of a water receptacle of a pan heater according to another embodiment of the present invention.

In one embodiment, shown in greater detail in FIG. 2, three sensors, in combination with an electronic control, are used to automate filling of the water receptacle or pan 200. The sensors are in this embodiment a low water cutout sensor 202, a low water sensor 204, and a high water shutoff sensor 206. The sensors are connected to a controller, described in further detail below, to control the flow and level of water in the water receptacle. In this embodiment, the water level in the pan warmer 100 must be between certain levels in order for operation of the warmer to take place. The levels are maintained using the sensors 202, 204, and 206. Low water sensor 204 is positioned so that if the water level reaches a low level in the pan 200, the sensor 204 activates the control mechanism to fill water into the pan 200 using water fill valve 208. Water is filled into the pan 200 until the high water shutoff sensor 206 is reached, at which point the water shuts off. In a situation in which the water level drops to the level of the low water cutoff sensor 202, any heat being generated by the heating elements 210 is also shut off to prevent damage to the heating elements 210 and to the pan 200. Such a situation might occur if water is draining from the pan 200 faster than the capability to refill it, or if water flow to the pan heater (such as heater 100) has been cut off for some reason. Water is drained from pan 200 through drain and drain valve 212. An overflow drain, not shown, provides relief for excess water flow not controlled by the controller, such as in cases where power to the system is disturbed or the like, to prevent damage to the system.

Figure 3:
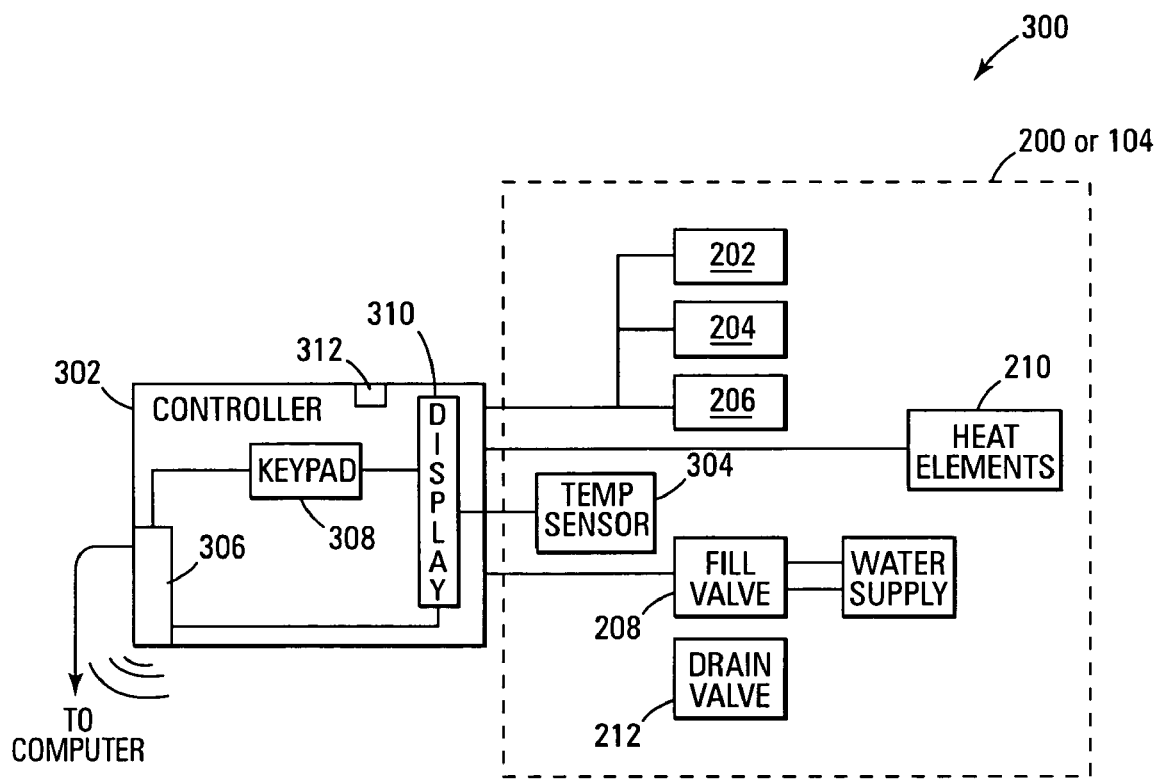
FIG. 3 is a block diagram of a control system for a pan heater according to another embodiment of the present invention.

A control system 300 suitable for controlling the embodiments of the pan warmer discussed above is shown in greater detail in FIGS. 3 and 4. FIG. 300 is a block diagram of the basics of control system 300. Control system 300 comprises in one embodiment the above mentioned sensors, each of which is operatively attached to a control 302. Control 302 receives information from the above mentioned sensors, as well as additional sensors about conditions in the water receptacle, including but not limited to water temperature, low and high water conditions and cutouts. Water temperature sensor 304 senses the temperature of the water in the receptacle and relays the information to the controller 302. When the temperature of the water is below a preset temperature programmed into the controller (as described later herein), the controller turns heating elements on until the water temperature reaches the preset temperature. The heating element is shut off when the programmed or preset temperature is reached or if the temperature exceeds the set point. In one embodiment, the controller is a digital controller. Digital controllers have increased sensitivity, so that cycling above and below the preset temperature is kept to reasonable amount. In analog or slower devices, temperature often fluctuated an unacceptable amount before heating or cooling could take effect, and even then, the heating or cooling applied tended to oscillate above and below the desired temperature. Improved sensitivity allows for an improvement in temperature tolerance and overshoot.

The temperature controller 300 is programmable in another embodiment to set a cycle or series of cycles for heating of the water in the pan warmer. The levels of temperature and the like, as well as the timing of cycles for the temperature of the water, are all programmable into the controller using a series of entries on a keypad 308 of the controller in one embodiment, the keypad being connected to a display 310. In one embodiment, display 310 includes indicator lights. In another embodiment, separate indicator lights 312 are provided. The indicator lights are described in further detail below.

In other embodiments, the controller is programmable using a computer and an interface 306 to the controller 302. Such an interface could include by way of example only and not by way of limitation a serial interface, a wireless interface, or the like. The controller also includes in one embodiment a lockout mechanism to prevent the operation of the controller without the entry of a code or the like. In this manner, the temperature cycle can be set at the beginning of a day or a shift, and the system will operate all day without adjustment being necessary or even possible, unless authorized. Still further, the temperature can be preset, and all that is required for operation of the pan warmer is to turn the system on in the morning or the like. The program executes, and sets the temperature of water in the pan warmer to the desired temperature.

Often, a pan is drained at the end of a day, and must be refilled before the next day. With the embodiments of the present invention, the pan warmer, once it is turned on, has stored in its controller the preset temperature of water for the water receptacle. The sensors detect an empty pan and begin to fill the pan with water using the water supply connected to the pan warmer. The water supply valve is controlled by the controller to provide water when the water level is below that of the low water cutout. Once the water level has reached the level of the low water cutout, the heating elements can be safely turned on. The controller turns the heating elements on and begins to heat the water in the water receptacle while the water continues filling. When the water reaches the high shutoff sensor, the controller turns the flow of water to the receptacle off. Heating continues until such time as the temperature of the water matches the preset temperature. Maintenance of water temperature occurs throughout the shift or day through continuous monitoring by the controller of the water temperature, and the running of the heating elements or water filling to make temperature adjustments.

Indicator lights 312 on the controller pad show the various states of operation of the pan heater 100. For example only, when the pan is filling, a fill indicator light may be lit. When the pan is at sufficient water level and temperature, an indicator light so indicating may be lit. When a condition indicating operation is necessary to maintain water temperature and levels is present, indicator lights can also so indicate. The controller embodiments of the present invention may also in other embodiments have panels for the indicator lights to indicate, for example, proper operation of the pan warmer, correct temperature of the water in the pan, correct water level, and whether the heating element is on or off.

When the controller is linked, as described above, to a computer system, not shown, the operation of the pan heater 100 may be controlled from the computer. A user can monitor the condition and programming of the controller, and modify it or simply verify the settings, from a remote location.

Figure 4:
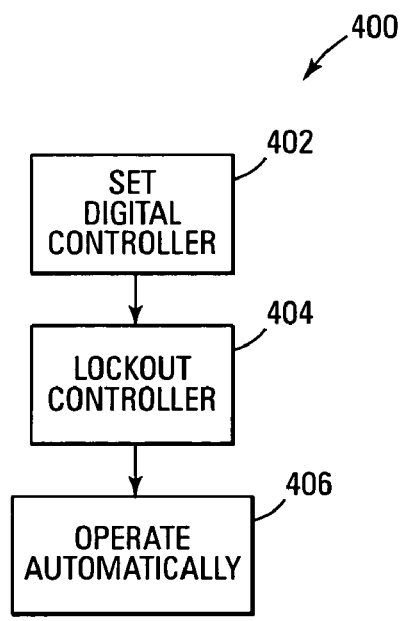
FIG. 4 is a flow chart diagram of a method according to another embodiment of the present invention.

FIG. 4 is a flow chart diagram of a method 400 for operating a pan warmer according to one embodiment of the present invention. Method 400 comprises setting a digital controller of a pan warmer in block 402, locking out further operating of the pan warmer until a correct code is entered in block 404, and automatic operation of the pan warmer according to the program in block 406. Automatic operation of the pan warmer comprises in one embodiment filling the pan with more water if a low water sensor is activated, warming the water in the pan when a temperature sensor indicates the pan temperature has dropped below a predetermined temperature, stopping flow of water to the pan when a high water level sensor determines that the pan has enough water, and operating the pan on a predetermined program.

The present invention has several advantages, including by way of explanation only and not by way of limitation set points for automatic operation without attending, auto fill and water level maintenance, digital temperature control with lockout function, precise monitoring of temperature with the digital control, remote linking to the unit for remote operation thereof, a sensor structure that shuts the heat off when the heating elements are not submerged, and the like.

CONCLUSION

A pan warmer and methods for its use have been described that include a digital programmable control unit for a pan warmer, the digital control unit being lockable to prevent tampering with the program. In various embodiments, the control unit is remotely accessible via a wired or wireless link to a computer for reprogramming thereof. Further, the pan warmer tank is filled in response to sensors which monitor low water and high water levels, and cut off power to heating elements if they are not submerged, to prevent damage to the pan warmer.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed:

1. A pan warmer, comprising:
   a pan body having an opening for a drop in pan;
   a drop in pan having a drain and a fill valve;
   a sensor for determining temperature of water in the pan;
   heating elements for heating water in the pan; and
   a controller connected to the sensor to receive signals from the sensor and to the heating elements to operate the heating elements, the automatic control comprising:
      a digital control to set a desired water temperature; and
      a lockout to prevent changing of the set desired water temperature without authorization.

2. The pan warmer of claim 1, and further comprising:
   a plurality of level sensors to measure the level of water in the pan; and
   a fill valve connectable to a water supply;
   wherein the controller is connected to receive signals form the plurality of level sensors and to operate the fill valve.

3. The pan warmer of claim 2, wherein the plurality of sensors comprises:
   a low water cutout sensor;
   a low water sensor; and
   a high water shutoff sensor;
   wherein the controller opens the fill valve when the low water sensor indicates a low water condition, the controller closes the fill valve when the high water shutoff sensor indicates a high water condition.

4. The pan warmer of claim 3, wherein the plurality of level sensors are arranged in the pan so that the low water cutout sensor is at a lower water level than the low water sensor, and the high water shutoff sensor is at a higher water level than the low water sensor.

5. The pan warmer of claim 1, and further comprising:
   a computer connectable to the controller to allow adjustment of the operating conditions by the computer.

6. The pan warmer of claim 5, wherein the computer system is as a remote location to the controller.

7. The pan warmer of claim 4, and further comprising:
   a temperature indicator light to indicate when the water in the pan is at the desired water temperature;
   a water level indicator light to indicate when the water in the pan is between the low water sensor level and the high water cutoff sensor level.

8. A pan warmer, comprising:
   a pan body having an opening for a drop in pan;
   a drop in pan having a drain and a fill valve, the fill valve connectable to a water supply;
   a plurality of heating elements disposed within the pan;
   a temperature sensor disposed to measure temperature of water in the pan;
   a plurality of level sensors to measure the level of water in the pan;
   a controller connected to receive signals from the sensors, and connected to operate the heating elements and the fill valve in response to received temperature and level sensor measurements.

9. The pan warmer of claim 8, wherein the plurality of level sensors comprises:
   a low water cutout sensor;
   a low water sensor; and
   a high water shutoff sensor;
   wherein the controller opens the fill valve when the low water sensor indicates a low water condition, the controller closes the fill valve when the high water shutoff sensor indicates a high water condition.

10. The pan warmer of claim 9, wherein the plurality of level sensors are arranged in the pan so that the low water cutout sensor is at a lower water level than the low water sensor, and the high water shutoff sensor is at a higher water level than the low water sensor.

11. The pan warmer of claim 8, and further comprising:
    a computer connectable to the controller to allow adjustment of the operating conditions by the computer.

12. The pan warmer of claim 11, wherein the computer system is as a remote location to the controller.

13. A pan warmer system, comprising:
    a pan warmer comprising:
       a pan body having an opening for a drop in pan;
       a drop in pan having a drain and a fill valve, the fill valve connectable to a water supply;
       a plurality of heating elements disposed within the pan;
       a temperature sensor disposed to measure temperature of water in the pan;
       a plurality of level sensors to measure the level of water in the pan; and
       a controller connected to receive signals from the sensors, and connected to operate the heating elements and the fill valve in response to received temperature and level sensor measurements; and
    a computer connectable to the controller to allow adjustment of the operating conditions by the computer.

14. A controller for a pan warmer, comprising:
    a digital temperature control to set a desired temperature for water in the pan warmer;
    a keypad for entering a lockout code to lock operation of the controller out unless the lockout code is entered;
    the controller connectable to a plurality of pan warmer sensors and elements to receive signals from the sensors and to operate the elements in response to received sensor measurements.

15. A method of operating a pan warmer, comprising:
    setting a controller with a desired pan water temperature; and
    locking out further adjustments of the temperature without a predetermined authorization.

16. The method of claim 15, and further comprising operating the controller from a remote location.

17. The method of claim 16, wherein operating from a remote location includes connecting to the controller over a network.

18. The method of claim 15, and further comprising:
monitoring temperature in a pan of the pan warmer;
heating water in the pan with a heating element when the temperature is lower than a predetermined desired water temperature;
monitoring water level in the pan; and
adding water to the pan when the water level falls below a predetermined water level.

19. The method of claim 18, and further comprising shutting off the heating elements when the water level drops below a predetermined low water level.

20. A method of operating a pan warmer, comprising:
monitoring temperature in a pan of the pan warmer;
heating water in the pan with a heating element when the temperature is lower than a predetermined desired water temperature;
monitoring water level in the pan;
adding water to the pan when the water level falls below a predetermined water level;
controlling the operation of the pan warmer using a controller connected to monitor the temperature and level, the controller programmable to set operating conditions once and then lock out changes in operation.

21. The method of claim 20, wherein monitoring water level in the pan comprises:
monitoring low water cutout conditions with a low water cutout sensor;
monitoring low water levels with a low water sensor; and
monitoring high water conditions with a high water shutoff sensor.

22. The method of claim 21, wherein controlling the operation of the pan warmer further comprises:
opening the fill valve when the low water sensor indicates a low water condition;
closing the fill valve when the high water shutoff sensor indicates a high water condition.

* * * * *